US005356100A

United States Patent [19]

Bookwalter et al.

[11] Patent Number: 5,356,100

[45] Date of Patent: Oct. 18, 1994

[54] SLIDING-FIT OPERATING TABLE STABILIZING POST AND RACK

[76] Inventors: John R. Bookwalter, 9 Belmont Ave., Brattleboro, Vt. 05301; William H. Bookwalter, 337 College St., Burlington, Vt. 05401

[21] Appl. No.: 7,913

[22] Filed: Jan. 22, 1993

[51] Int. Cl.[5] .......... F16M 11/00

[52] U.S. Cl. .......... 248/122; 248/188.5; 248/287; 248/295.1; 248/414

[58] Field of Search .......... 248/122, 121, 161, 411, 248/414, 188.5, 287, 295.1, 298; 384/42; 74/422; 403/377

[56] References Cited

U.S. PATENT DOCUMENTS

| | | | |
|---|---|---|---|
| 1,378,904 | 5/1921 | Schuermann | 248/161 X |
| 3,054,645 | 9/1962 | Evans | 384/42 |
| 3,112,910 | 12/1963 | Bal | 248/414 X |
| 3,262,666 | 7/1966 | Solum | 248/414 X |
| 3,537,762 | 11/1970 | Lödige | 384/42 |
| 4,330,696 | 5/1982 | Pomeroy et al. | 248/349 X |
| 4,522,361 | 6/1985 | Mooney | 248/411 X |
| 4,558,893 | 12/1985 | Shelly | 248/161 X |
| 4,738,081 | 4/1988 | Tisma | 384/42 X |
| 4,944,606 | 7/1990 | Lindsey et al. | 384/42 |
| 5,167,223 | 12/1992 | Koros et al. | 74/422 X |

*Primary Examiner*—Ramon O. Ramirez
*Assistant Examiner*—Derek J. Berger
*Attorney, Agent, or Firm*—Donald W. Meeker

[57] ABSTRACT

A rectangular top post slides into an operating table post base opening just large enough to receive it. Rulon (TM) rods are inserted in slots around the opening. The rods are secured permanently in the slots and the rods protrude into the opening evenly at six points spaced around the opening. The Rulon (TM) rods provide a tight-fitting restraint on the bar, but because of the slidability along the surface of the rods, the post may be moved manually up or down with a minor effort. The tight sliding fit maintains the post rigidly in place without moving up or down or twisting once the bar is in a set position. Motion is only possible in a vertical direction. A casing attached to the top of the top post houses a rack and pinion drive with a rack arm extending out over a patient. Surgical apparatus, such as retractors, are attached to the rack arm.

3 Claims, 1 Drawing Sheet

SLIDING-FIT OPERATING TABLE STABILIZING POST AND RACK

BACKGROUND OF THE INVENTION

1. Technical Field

The present invention relates to operating table stabilizing posts and in particular to an operating table stabilizing post which slides vertically and is maintained in position by a sliding fit with no clamps.

2. Description of the Prior Art

In surgery there is a need for stabilizing posts attached to the operating table to secure surgical apparatus, such as retractors, in stable positions around the operating field. Care must be taken to avoid exerting undue pressure on the patient, while at the same time trying to stabilize the retractors and other apparatus.

A major consideration in an operating room is maintaining a sterile environment. The more complex the apparatus used in an operating room environment, the more opportunity there is for contamination. Exposed threads on screws and other parts of complex mechanical equipment present contamination hazards as well as posing a hazard of potential parts from a broken piece of equipment falling into the operating field. Exposed components also pose a hazard to the staff in the operating room in terms of bumping into protruding pieces of equipment.

Most prior art stabilizing posts use clamps to control the vertical motion. These clamps protrude from the post and pose all of the problems listed above including the difficulty of restricting vertical motion with the clamp creating a danger of exerting too much pressure on the patient.

DISCLOSURE OF INVENTION

The present invent ion provides a sliding fit for a stabilizer post with six Rulon (TM) rods secured around a rectangular opening in a stabilizer post base clamped to an operating table. A rectangular cross-section top post of the stabilizer post slides into the rectangular opening and rides on the rods with a tight sliding fit. The rods prevent any twisting or horizontal motion of the rectangular post inserted therein, but because of the lubricating quality of the Rulon (TM), allow vertical motion with relative ease. This enables easy movement of the stabilizing post without having to tighten clamps and also prevents too much pressure being exerted on the patient, because the retractors or other apparatus attached to the post will push the post up rather than creating pressure on the patient.

Using a smooth base and a smooth post with no clamps or other protrusions eliminates problems concerning sterilization and bumping into equipment.

A rack and pinion drive mechanism extends an arm horizontally from the top of the stabilizer post over the patient, providing adequate power and precision to move surgical apparatus attached to the arm.

BRIEF DESCRIPTION OF THE DRAWINGS

These and other details and advantages of our invention will be described in connection with the accompanying drawings, which are furnished only by way of illustration and not in limitation of the invention, and in which drawings.

BEST MODE FOR CARRYING OUT THE INVENTION

Figure 1:
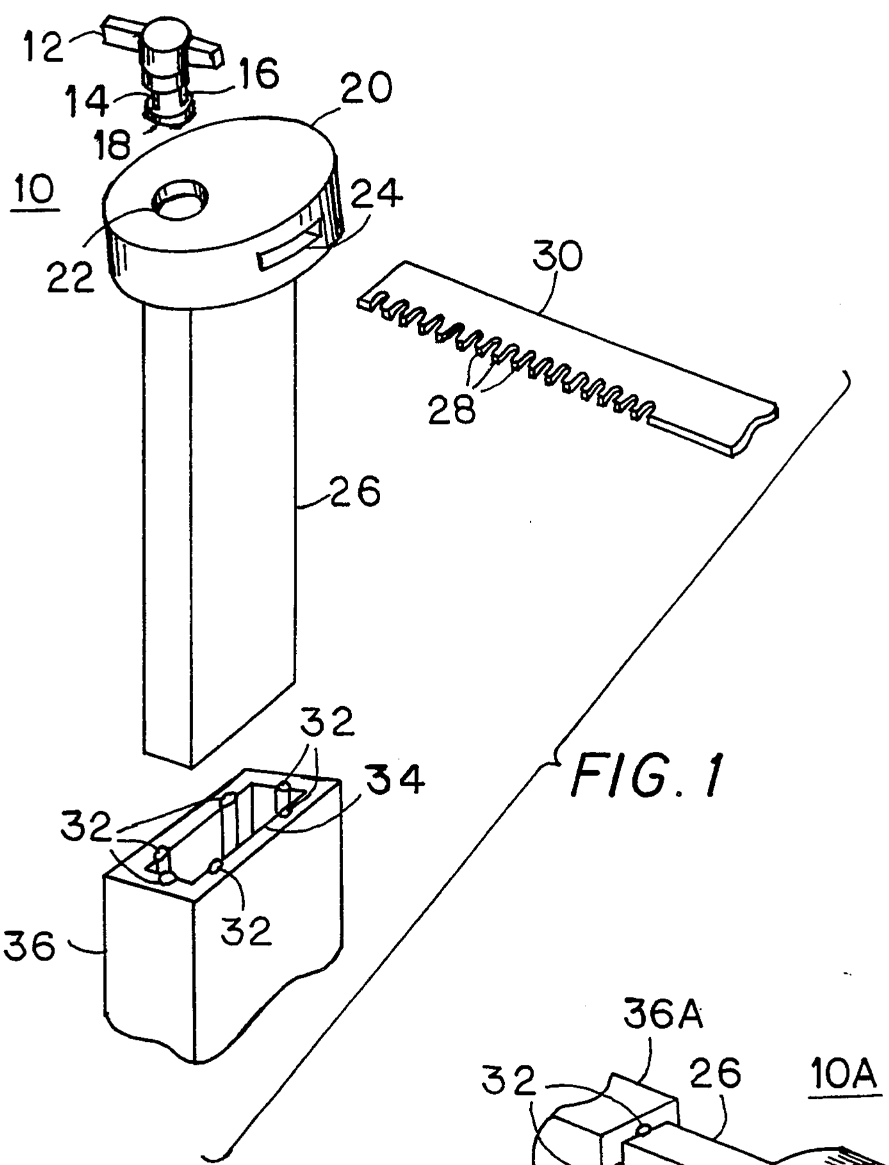
FIG. 1 is an exploded view showing the components of the sliding-fit stabilizer post with rack arm.
Figure 2:
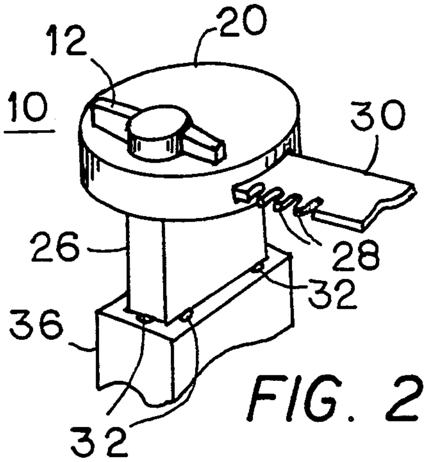
FIG. 2 is a perspective view of the invention assembled in a vertical orientation.

In FIGS. 1 and 2, a sliding-fit operating table stabilizing post 10 comprises a rectangular base post 36 secured to an operating table (not shown), a top post having a long rectangular foot 26 sliding fit in a base post opening 34, and a circular top casing 20 on the top post above the rectangular foot. The top casing houses a rack arm 30 moved perpendicularly to the post by a pinion turned with a handle 12. The pinion has two posts 14 and 16 secured between a circular disc 18 and the handle 12, which posts alternately fit into adjacent teeth 28 on the rack arm 30 when the pinion is turned, moving the rack arm horizontally. The rack arm extends from the stabilizer post over a patient and can be moved as desired by turning the pinion handle 12. Surgical apparatus, such as retractors are attached to the rack arm.

The rectangular opening 34 on a top surface of the base post 36 has six slots around the perimeter of the opening fitted securely with six sterilizable lubricating Rulon (TM) rods 32 which protrude evenly into the rectangular opening. Rulon (TM) is used because of its properties as a lubricating surface which is harder than Teflon (TM) to prevent twisting and also be able to withstand sterilization in an autoclave, while creating an appropriate sliding surface. The rods are positioned with two rods on each long side of the rectangle and one rod on each short side of the rectangle all evenly spaced and all protruding slightly into the rectangular opening to provide six contact points for the rectangular foot 26 of the top post. When the top post slides into the opening it forms a rigid shaft movable only vertically, wherein the rods are the sole vertical support maintaining the top post stationary unless an external force is applied.

Figure 3:
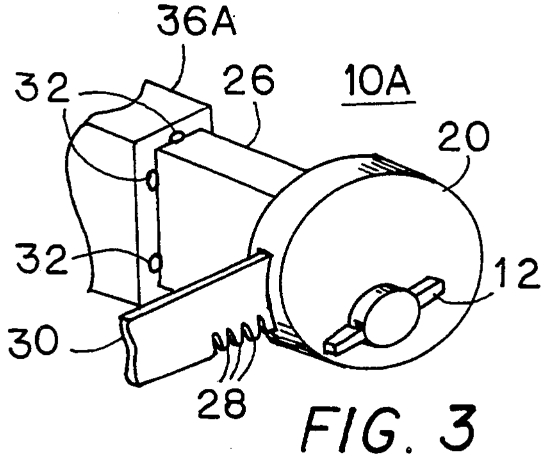
FIG. 3 is a perspective view of the invention assembled in a horizontal orientation.

In FIG. 3 an alternative embodiment of the invention 10A shows how the top post 26 may be mounted in another opening lined with Rulon (TM) rods 32 in another post 36A oriented horizontally or in different directions with the circular casing 20 and rack arm 30 vertically oriented and extending on other directions.

The components of the invention may be fabricated from stainless steel or other strong and sterilizable materials. Because of ease of machining and lightness of handling as well as cost factors, the top post 26 and casing 20 may be fabricated of aluminum with nickel-Teflon (TM) hard coat.

It is understood that the preceding description is given merely by way of illustration and not in limitation of the invention and that various modifications may be made thereto without departing from the spirit of the invention as claimed.

We claim:

1. A sliding-fit operating table stabilizing post comprising a base post secured to an operating table, which base post has a rectangular opening on a top surface;

vertical slots positioned around the interior of the rectangular opening and sterilizable lubricating elements comprising six rods inserted in said slots, wherein the rods are positioned with two rods on each long side of the rectangular opening and one rod on each short side of the rectangular opening all evenly spaced and all protruding evenly into the rectangular opening;

a top post having a long foot of rectangular cross section in a size and shape which is inserted with a sliding fit into the base post rectangular opening to slide vertically therein with no twisting and no horizontal movement, wherein the lubricating rods provide six contact points for the foot of the top post and are the sole vertical support maintaining the top post stationary;

a circular top casing on the top post, which casing houses a movable support arm, which arm is capable of supporting surgical apparatus attached thereto, which top casing comprises a rack arm and a pinion, whereby said rack arm may be moved perpendicularly to the post by turning said pinion, wherein the rack arm may extend from the stabilizer post over a patient, and which rack arm is capable of supporting surgical apparatus.

2. A sliding-fit operating table stabilizing post comprising a rectangular base post for securement to an operating table, which base post has a rectangular opening on a top surface;

six sterilizable lubricating rods positioned around the interior of the opening, which rods protrude evenly into the rectangular opening;

a top post having a long rectangular foot inserted with a sliding fit into the base post opening, wherein the top post when inserted in the opening comprises a rigid shaft movable only vertically, wherein the rods are the sole vertical support maintaining the top post stationary;

a circular casing on the top post above the rectangular foot, which top casing houses a rack arm and a pinion, whereby said rack arm may be moved perpendicularly to the post by turning said pinion, wherein the rack arm extend from the stabilizer post over a patient, and which rack arm is capable of supporting surgical apparatus.

3. The invention of claim 1 wherein the rods are positioned with two rods on each long side of the rectangular opening and one rod on each short side of the rectangular opening all evenly spaced and all protruding evenly into the rectangular opening to provide six contact points for the rectangular foot of the top post.

* * * * *